(12) United States Patent
Otsuka et al.

(10) Patent No.: US 12,053,340 B2
(45) Date of Patent: Aug. 6, 2024

(54) LATERAL BRANCH DETECTION DEVICE, LATERAL BRANCH DETECTION PROBE, LATERAL BRANCH DETECTION METHOD, AND PROGRAM FOR SAME

(71) Applicants: TOEI ELECTRIC CO., LTD., Tokyo (JP); THE YOSHIDA DENTAL MFG. CO., LTD., Tokyo (JP)

(72) Inventors: Masahiro Otsuka, Tokyo (JP); Michizo Yamanaka, Tokyo (JP)

(73) Assignees: TOEI ELECTRIC CO., LTD., Tokyo (JP); THE YOSHIDA DENTAL MFG. CO., LTD., Tokyo (JP)

( * ) Notice: Subject to any disclaimer, the term of this patent is extended or adjusted under 35 U.S.C. 154(b) by 171 days.

(21) Appl. No.: 16/634,251

(22) PCT Filed: Dec. 21, 2018

(86) PCT No.: PCT/JP2018/047174
§ 371 (c)(1),
(2) Date: Jan. 27, 2020

(87) PCT Pub. No.: WO2019/150838
PCT Pub. Date: Aug. 8, 2019

(65) Prior Publication Data
US 2020/0368004 A1 Nov. 26, 2020

(30) Foreign Application Priority Data
Jan. 30, 2018 (JP) .................. 2018-013980

(51) Int. Cl.
*A61C 19/04* (2006.01)
(52) U.S. Cl.
CPC .......... *A61C 19/043* (2013.01); *A61C 19/042* (2013.01); *A61C 2204/00* (2013.01)

(58) Field of Classification Search
CPC . A61C 19/043; A61C 19/042; A61C 2204/00; A61C 19/041
See application file for complete search history.

(56) References Cited

U.S. PATENT DOCUMENTS 4,447,206 A * 5/1984 Ushiyama .............. A61C 19/04
324/715
6,059,569 A * 5/2000 Otsuka .................. A61C 19/041
433/72

(Continued)

FOREIGN PATENT DOCUMENTS

JP 62-166822 U 10/1987
JP 10-137268 A 5/1998

(Continued)

OTHER PUBLICATIONS

International Search Report and Written Opinion dated Mar. 5, 2019 corresponding to International Patent Application No. PCT/JP2018/047174.

*Primary Examiner* — Jacqueline T Johanas
*Assistant Examiner* — Drew S Folgmann
(74) *Attorney, Agent, or Firm* — SQUIRE PATTON BOGGS (US) LLP

(57) ABSTRACT

Provided is a lateral branch detection probe whereby the condition of a lateral branch can be detected merely by inserting the lateral branch detection probe to an apex. A lateral branch detection probe detects, after insertion thereof into a root canal of a tooth, the presence/absence of a lateral branch and the position of the lateral branch in the root canal axis direction, the lateral branch detection probe being provided with a plurality of measurement electrodes extending to different positions in the root canal axis direction at predetermined intervals. The measurement electrodes constitute a measurement terminal group in which each measurement electrode is covered with an insulator except for (Continued)

one end portion, and another end portion thereof is connectable to a detection-purpose power supply on a detection device side.

6 Claims, 13 Drawing Sheets

(56) References Cited

U.S. PATENT DOCUMENTS

| | | |
|---|---|---|
| 2008/0182223 A1 | 7/2008 | Yamashita et al. |
| 2014/0120492 A1* | 5/2014 | Ioannidis ............. A61C 19/043 433/27 |
| 2017/0042649 A1 | 2/2017 | Otsuka |

FOREIGN PATENT DOCUMENTS

| | | | |
|---|---|---|---|
| JP | 2008-110141 A | 5/2008 | |
| JP | 2009-022726 A | 2/2009 | |
| JP | 2016-500537 A | 1/2016 | |
| JP | 6035390 B1 * | 11/2016 | ........... A61B 5/0534 |
| JP | 2017-035331 A | 2/2017 | |

* cited by examiner

LATERAL BRANCH DETECTION DEVICE, LATERAL BRANCH DETECTION PROBE, LATERAL BRANCH DETECTION METHOD, AND PROGRAM FOR SAME

TECHNICAL FIELD

The present invention relates to a technique of detecting a lateral branch extending from a root canal into a tooth during diagnosis or treatment in dentistry.

BACKGROUND ART

When an operator performs a dental treatment, it may be necessary to remove the pulp or affected dentin in a root canal. FIG. 13 illustrates a cross-sectional view of a tooth. In FIG. 13, a denotes a tooth, b denotes a root canal, c denotes an apical foramen, d denotes a gingiva, e denotes a lateral branch extending from the root canal to a periodontal ligament space h, f denotes an alveolar bone, g denotes a tooth measurement reference point, and h denotes a periodontal ligament space. The operator measures the distance from the tooth measurement reference point g to the apical foramen c, and then removes the pulp and others (nerve, bacteria-infected affected dentin, or foreign matter in the root canal) in the root canal b corresponding to the distance. An apical position detection device is used to measure the distance from the tooth measurement reference point g to the apical foramen c. The apical position detection device applies an alternating current signal between a measurement electrode placed in the oral cavity and an oral electrode in the process of insertion into the root canal b, and detects the apical position according to the value of the signal (electric characteristic value) measured when the measurement electrode reaches the apical position.

The operator can learn that the measurement electrode has reached an apex by monitoring that an indicator on the display unit points at a predetermined position. On the other hand, in the case of providing root canal treatment, the pain of the patient often does not heal even after the operator performs the root canal treatment in the medical care process. When lesions are located not only at the apex but also on the root canal b side, there are cases in which alleviation of symptoms cannot be expected unless treatment is performed paying attention to the lateral branch e.

In view of the above, a lateral branch detection device has conventionally been proposed which detects the condition of the lateral branch e extending from the root canal b to the periodontal ligament space h (for example, Patent Literature 1). The lateral branch detection device described in Patent Literature 1 detects the condition of the lateral branch e based on a waveform indicating the transition of indication data which changes along with insertion of the measurement electrode into the root canal b.

CITATION LIST

Patent Literature

Patent Literature 1: Japanese Unexamined Patent Application Publication No. 2009-22726

SUMMARY OF INVENTION

Technical Problem

However, the lateral branch detection device described in Patent Literature 1 needs to detect the condition of each lateral branch while gradually inserting the measurement electrode into the root canal, and accordingly has a problem of requiring such troublesome work for detecting the condition of each lateral branch.

Therefore, the present invention aims to provide a technique which makes it possible to detect the condition of each lateral branch only by being inserted to the apex.

Solution to Problem

For the purpose of solving the above-described problem, a lateral branch detection device according to the present invention is a lateral branch detection device which detects a condition of a lateral branch after being inserted into a root canal of a tooth of a subject, the lateral branch detection device comprising: a measurement electrode group including a plurality of measurement electrodes which are inserted into the root canal; a subject electrode which is disposed on a part of a body of the subject; and a power supply which sequentially switches and applies input signals for measurement to each of the measurement electrodes of the measurement electrode group, wherein the lateral branch detection device detects the condition of the lateral branch extending from the root canal to a periodontal ligament space based on a plurality of measurement datasets sequentially detected between the measurement electrodes and the subject electrode based on the input signals for measurement from the power supply.

Advantageous Effects of Invention

The lateral branch detection device according to the present invention can detect the condition of the lateral branch only by being inserted to the apex.

DESCRIPTION OF EMBODIMENTS (Lateral Branch Detection Method)

First, a lateral branch detection method by a conventional lateral branch detection device 100 is described, and then embodiments are described in detail.

Figure 1:
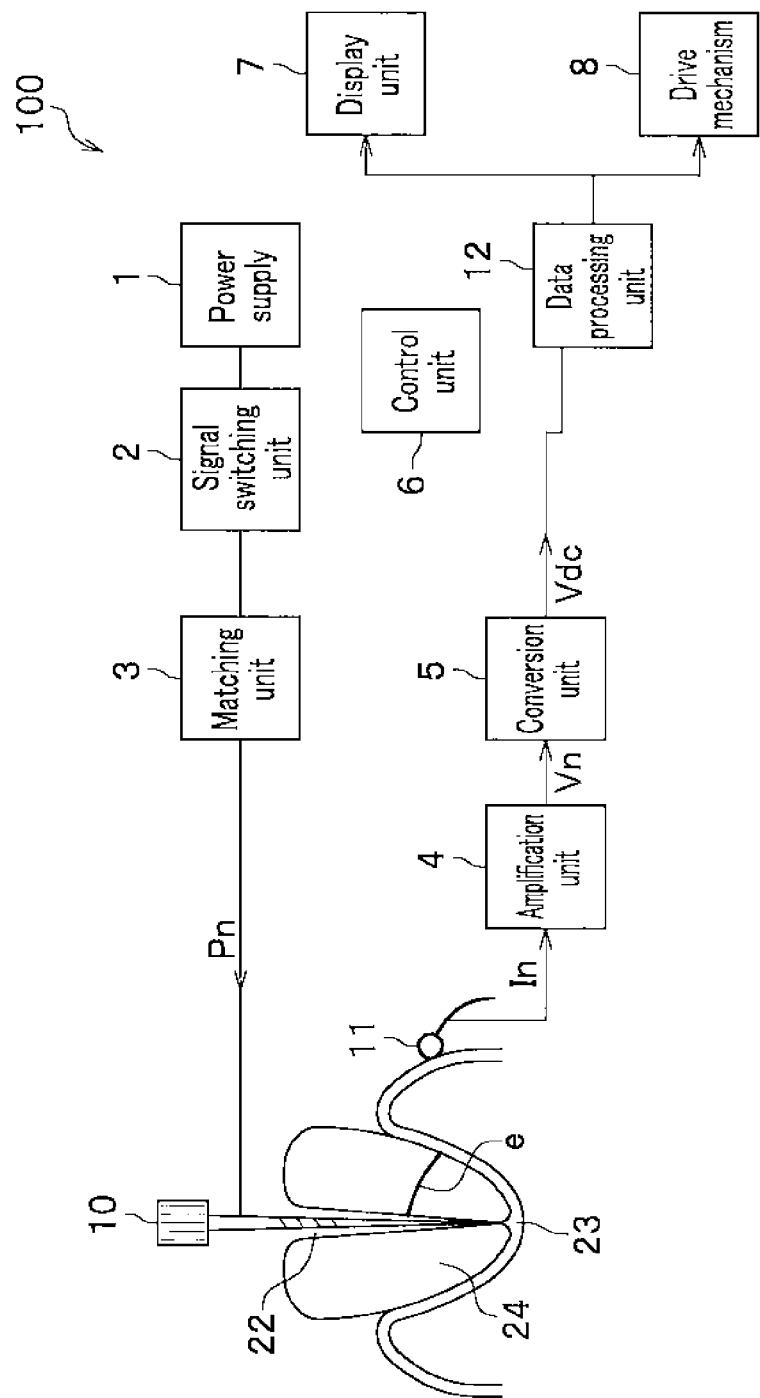
FIG. 1 is a block diagram illustrating a configuration of a conventional lateral branch detection device.

As illustrated in FIG. 1, the lateral branch detection device 100 includes a power supply 1, a signal switching unit 2, a matching unit 3, an amplification unit 4, a conversion unit 5, a control unit 6, a display unit 7, a drive mechanism 8, a measurement electrode 10, an oral electrode 11, and a data processing unit 12.

The power supply 1 outputs input signals for measurement Pn having one or more different frequencies. The power supply 1 outputs input signals for measurement Pn having two frequencies, for example, 500 Hz and 2 KHz. The signal switching unit 2 selects or switches a frequency of 500 Hz or 2 KHz in accordance with an instruction from the control unit 6, and sequentially supplies it to the matching unit 3. The matching unit 3 converts the input signals for measurement Pn supplied to the measurement electrode 10 into a safe voltage. The amplification unit 4 converts and amplifies the measurement data (measurement current In) obtained from the oral electrode 11 placed on the gingiva of the inspection tooth 24 into a measurement current Vn. The conversion unit 5 converts the measurement current Vn into a direct current voltage Vdc. The control unit 6 controls and processes the elements of the lateral branch detection device 100. In addition, in the lateral branch detection device 100, a storage unit (not illustrated) can be disposed in the control unit 6 if necessary. The display unit 7 displays a measurement result based on the direct current voltage Vdc and/or emits a warning sound in accordance with an instruction from the control unit 6. The drive mechanism 8 is intended for automatically moving the measurement electrode 10 toward the apex 23 in the case of automating the lateral branch detection device 100, and can include an interface circuit. The drive mechanism 8 can be employed as necessary or not employed. The data processing unit 12 creates display data to be sent to the display unit 7 in response to the direct current voltage Vdc. When a input signal for measurement Pn having a frequency of, for example, 500 Hz or 2 KHz is applied from the power supply 1 to the measurement electrode (for example, a reamer) 10, two types of measurement data ($In_{500\ Hz}$ and $In_{2\ KHz}$) for the frequencies are measured between the measurement electrode 10 and the oral electrode 11. These two types of measurement data ($In_{500\ Hz}$, $In_{2\ KHz}$) are sequentially measured in the process of inserting the measurement electrode (reamer) 10 into the apex 23 in the root canal 22.

It was confirmed that the transition waveform of the measurement data In obtained during insertion of the measurement electrode 10 toward the apex 23 showed a specific change depending on whether or not the tooth had the lateral branch e. Specifically, the measurement data (In, Vn, Vdc) is sent to the display unit 7 as display data indicating the presence or absence of the lateral branch e, and can be displayed.

Figure 2:
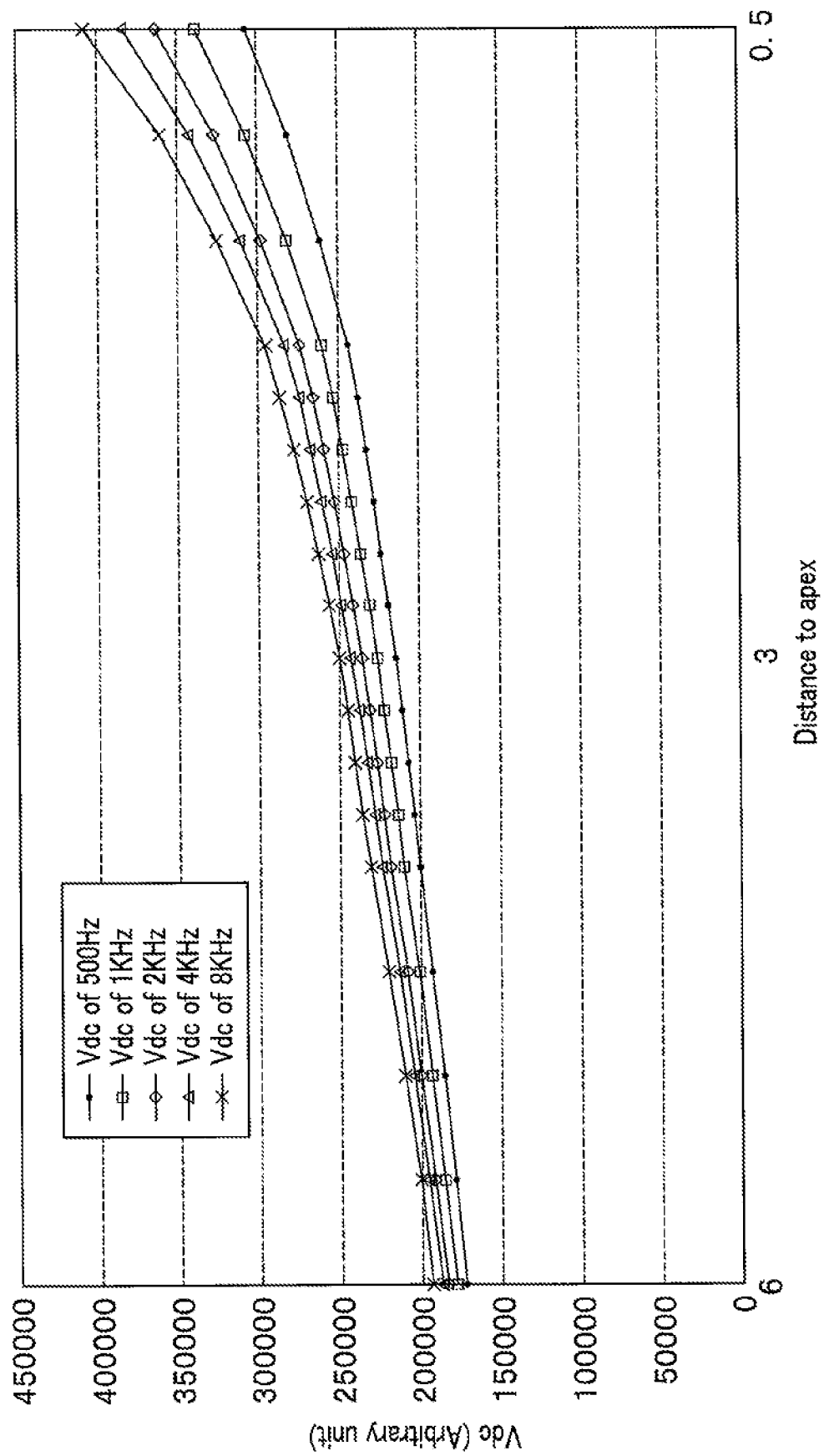
FIG. 2 is a graph illustrating measurement data, at various measurement frequencies, of an inspection tooth having no lateral branch but an apical foramen.
Figure 3:
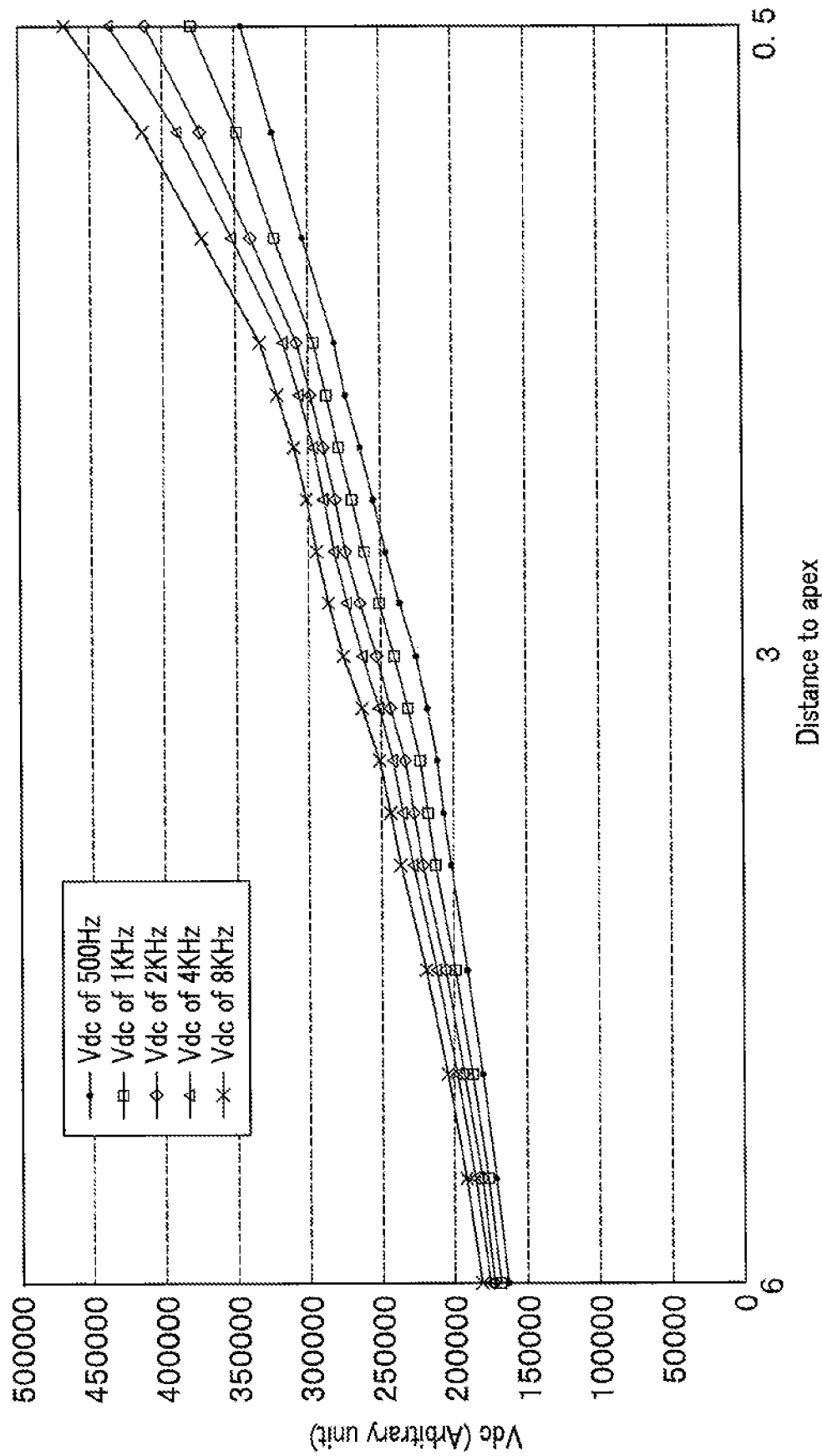
FIG. 3 is a graph illustrating measurement data, at various measurement frequencies, of an inspection tooth having a lateral branch and an apical foramen.

The horizontal axes of FIG. 2 and FIG. 3 indicate the position of the distal end of the measurement electrode 10. This distance is the distance from the distal end of the measurement electrode 10 to the position of the apex 23. The vertical axis indicates the value of measurement data at frequencies such as 500 Hz and 2 KHz (direct current voltages $Vdc_{500\ Hz}$ and $Vdc_{2\ KHz}$).

Figure 4:
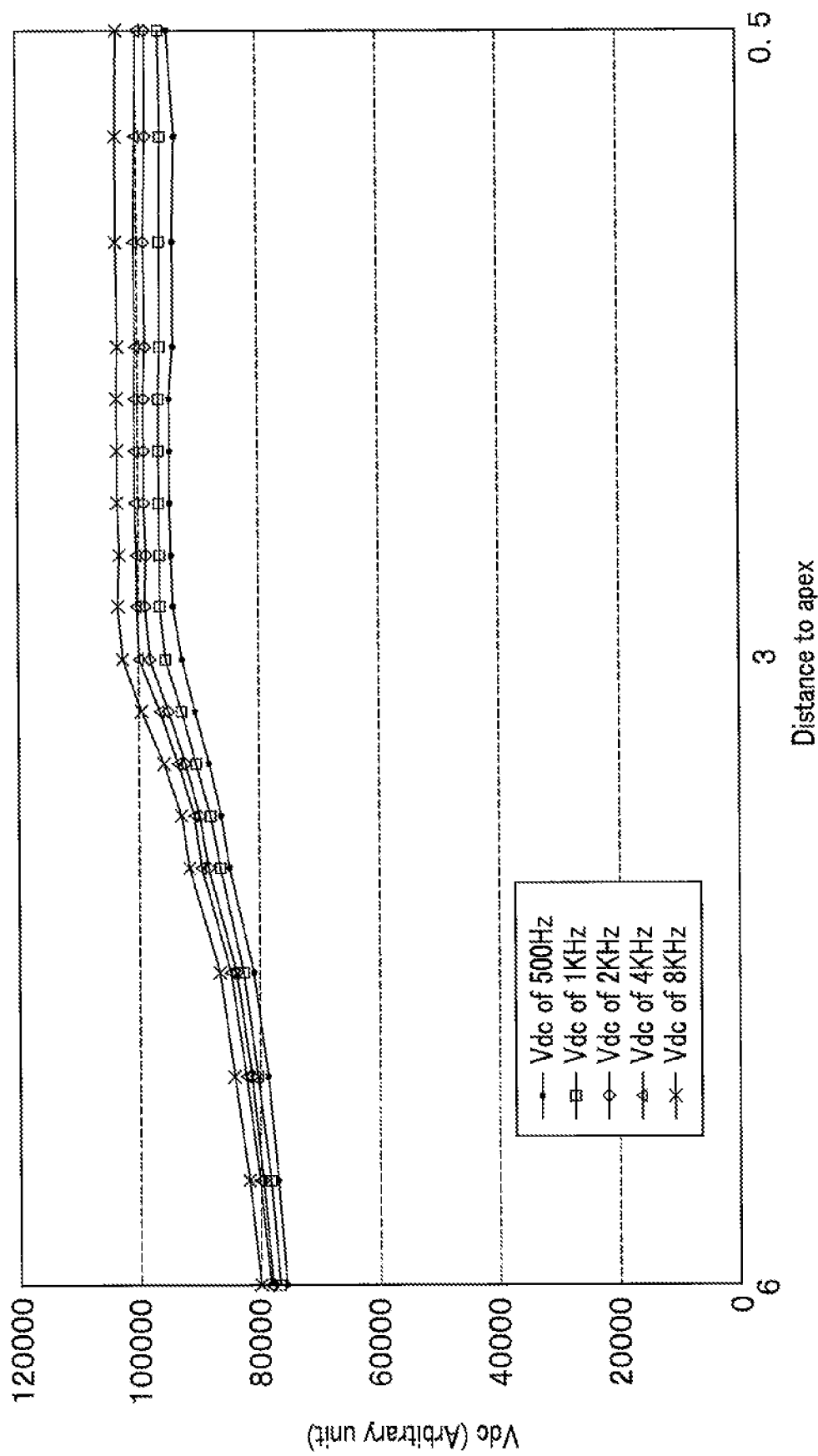
FIG. 4 is a graph illustrating measurement data, at various measurement frequencies, of an inspection tooth having a lateral branch but no apical foramen.

FIG. 2, FIG. 3, and FIG. 4 illustrate the transition of measurement data (transition waveform) when the measurement electrode 10 is moved toward the apex 23 and input signals for measurement of frequencies of 500 Hz, 1 KHz, 2 KHz, 4 KHz, and 8 KHz are applied to the measurement electrode 10.

FIG. 2 illustrates the transition waveform of the measurement data at each frequency when the inspection tooth 24 has no lateral branch but an apical foramen. Similarly, FIG. 3 illustrates the transition waveforms of the measurement data at various measurement frequencies when the inspection tooth 24 has an apical foramen and has the lateral branch e at the position near 3 mm from the apex 23. FIG. 4 illustrates the transition waveform of the measurement data at each frequency when the inspection tooth 24 has a lateral branch e but no apical foramen. Note that, when the inspection tooth 24 has no lateral branch e and no apical foramen, a current does not easily flow between the measurement electrode 10 and the oral electrode 11, and thus measurement data is difficult to obtain.

In FIG. 3, it is confirmed that, in the vicinity of the position of the lateral branch e (3 mm), the measurement data (direct current voltage Vdc) at each measurement frequency changes from a linear increasing transition waveform to a relatively flat transition waveform, although there is a difference in extent depending on the frequency. Such a change is not observed in the measurement data of FIG. 2 in which the inspection tooth 24 has no lateral branch e.

FIG. 4 illustrates the measurement data of the inspection tooth 24 having a lateral branch but no apical foramen. The measurement data (direct current voltage Vdc) changes from an increasing to a substantially flat transition waveform near the position of the lateral branch e (3 mm).

The reason for the changes in measurement data illustrated in the above figures is considered as follows.

In FIG. 1, when the measurement electrode 10 is inserted toward the apex 23 into the root canal 22, the measurement current In flowing between the measurement electrode 10 and the oral electrode 11 flows from the measurement electrode 10 via the apex 23 and the lateral branch e to the position where the lateral branch e exists. Specifically, a current corresponding to the distance between the distal end of the measurement electrode 10 and the lateral branch e flows. However, when the measurement electrode 10 passes the position of the lateral branch e, the distance between the main body surface of the measurement electrode 10 and the lateral branch e remains constant, and the current passing through the lateral branch e has a substantially constant value corresponding to the distance.

In the lateral branch detection device 100 illustrated in FIG. 1, it is possible to allow the display unit 7 such as an oscilloscope to display the transition waveform of the measurement data. The transition waveform of the measurement data (direct current voltage Vdc) outputted from the data processing unit 12 can be processed so that the change in the vertical axis direction (change in height) is enlarged and displayed. In particular, even in the case of the inspection tooth 24 illustrated in FIG. 4 having a lateral branch e but no apical foramen, this enlarging display makes it possible for the operator to more clearly grasp the presence of the lateral branch e from the transition waveform of the measured value shown on the display unit 7. Such processing for enlarging display can also be performed by the display unit 7.

The data processing unit 12 can also be provided with a notification unit for automatically monitoring changes in measurement data and automatically detecting and notifying the presence of the lateral branch e. This notification unit can notify the operator that the lateral branch e has been detected by sound, vibration, character display on the display unit 7, or color display.

The mechanism for automatically monitoring the change in the transition waveform of the measured value can be a mechanism which notifies the display unit 7 of the detection of a situation where the rate of increase of the transition waveform has decreased or the transition waveform has become substantially flat as a result of monitoring the transition waveform of the measured data during measurement.

As necessary, the lateral branch detection device 100 can further include a mechanism for measuring the position of the distal end of the measurement electrode 10 when the measurement electrode 10 is inserted into the root canal 22.

This mechanism for measuring the position of the measurement electrode 10 makes it possible to measure and display not only the presence or absence of the lateral branch e but also the position of the lateral branch e.

As a mechanism for measuring the position of the distal end of the measurement electrode 10 in the root canal 22 in the case of employing an automatic insertion device which automatically inserts the measurement electrode 10, it is possible to incorporate a mechanism for detecting the distance along which the measurement electrode 10 is automatically inserted into the automatic insertion device.

Here, the lateral branch detection device 100 may generate display data indicating the presence or absence of the lateral branch e by performing predetermined processing on a plurality of measurement datasets $In_{500\ Hz}$ and $In_{2\ KHz}$ corresponding to the measurement frequencies.

Figure 5:
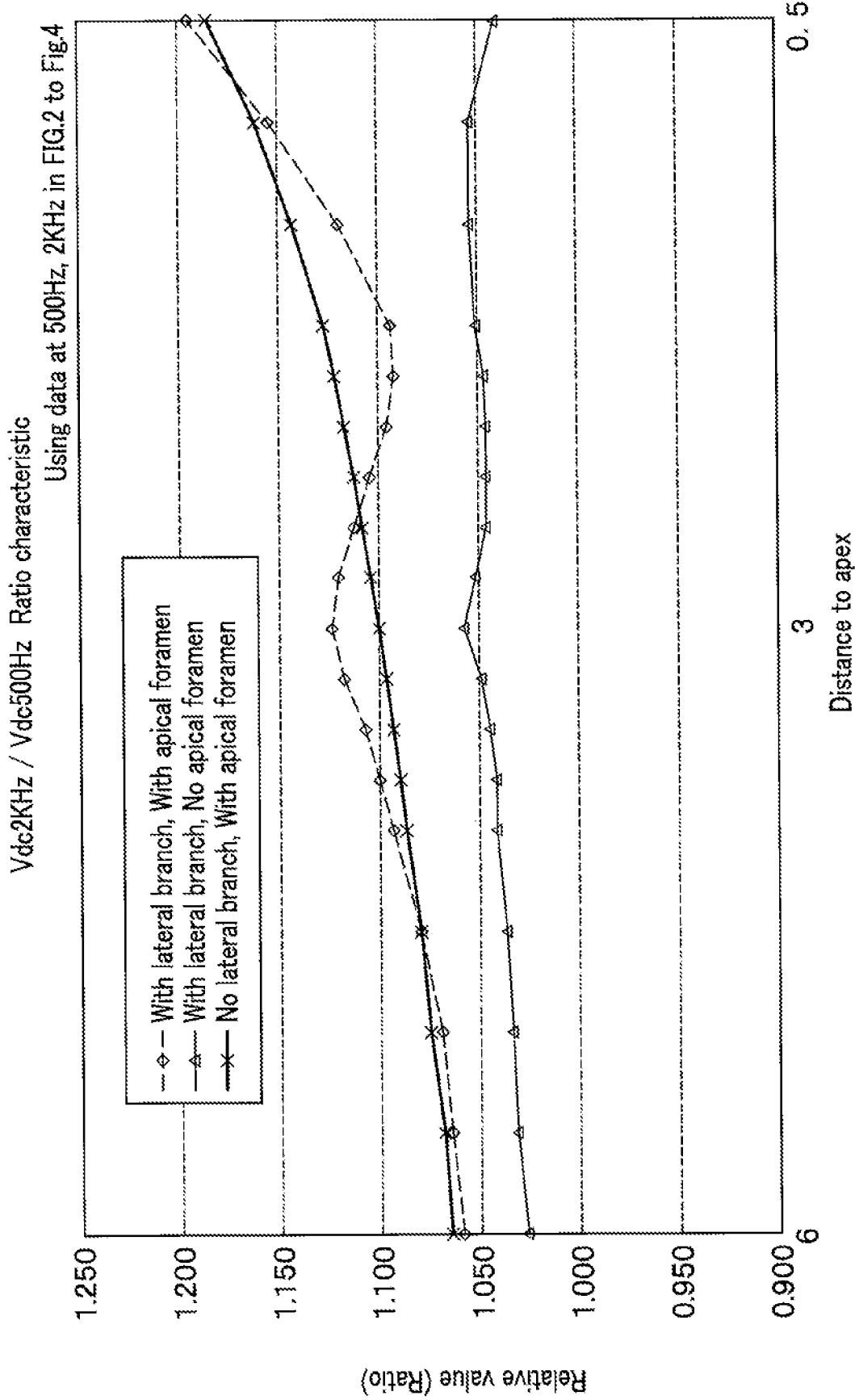
FIG. 5 is a graph illustrating a transition waveform of a ratio of measurement signals obtained by using input signals for measuring of 2 kHz and 500 Hz.
Figure 6:
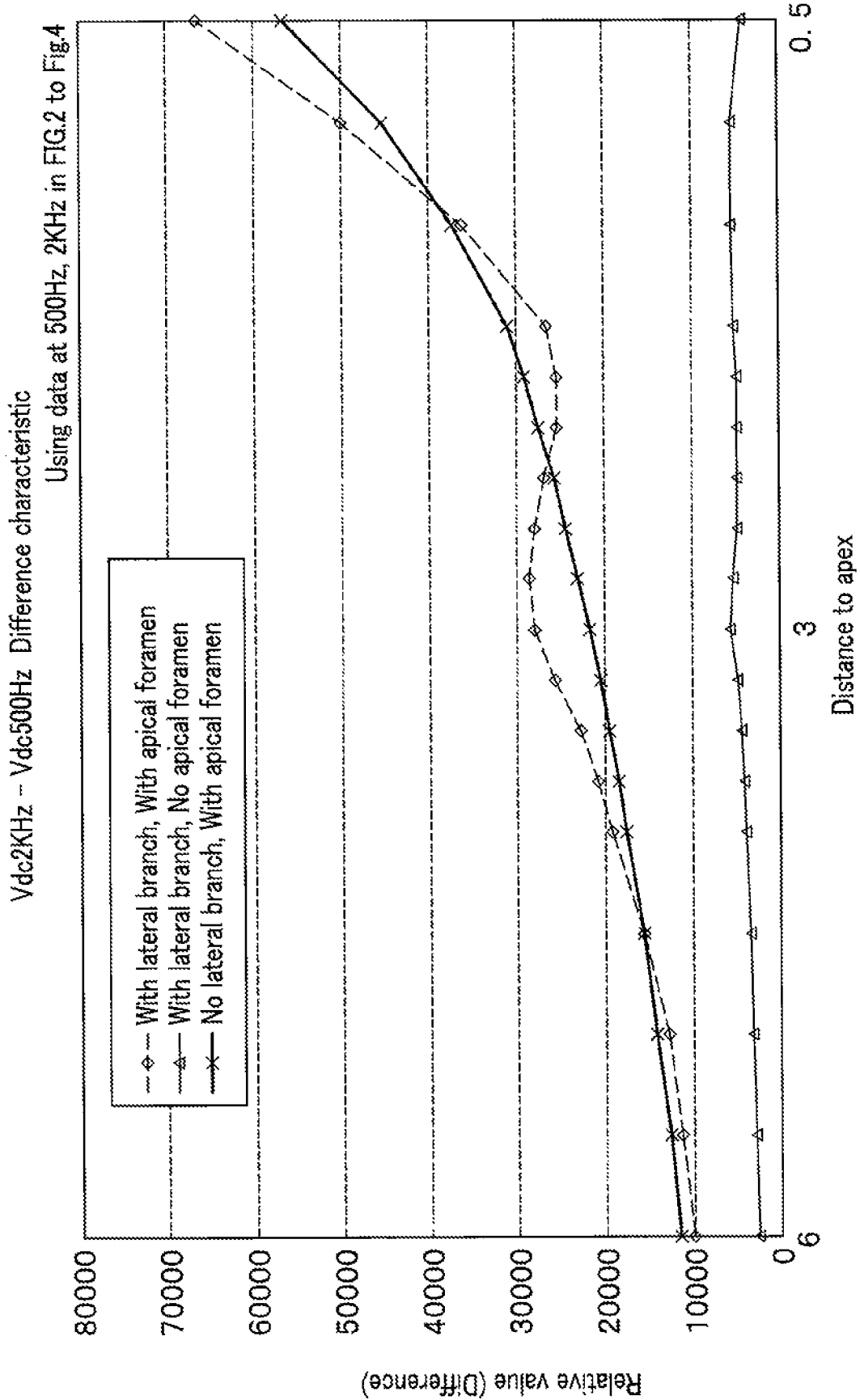
FIG. 6 is a graph illustrating a transition waveform of a difference of measurement signals obtained by using input signals for measuring of 2 kHz and 500 Hz.

As described above, the lateral branch detection device 100 inserts the measurement electrode 10 into the root canal 22 of the inspection tooth 24, and moves it toward the apex 23. At this time, the input signals for measurement $Pn_{500\ Hz}$ and $Pn_{2\ KHz}$ having different frequencies (for example, 500 Hz and 2 KHz) are switched from the power supply 1 and sequentially applied to the measurement electrode 10. As a result, in the process in which the distal end of the measurement electrode 10 descends, measurement data $In_{500\ Hz}$ and $In_{2\ KHz}$ corresponding to the input signals for measurement $Pn_{500\ Hz}$ and $Pn_{2\ KHz}$ of 500 Hz and 2 KHz are sequentially outputted from the oral electrode 11. FIG. 5 and FIG. 6 illustrate the transition (transition waveform) of these measurement datasets $In_{500\ Hz}$ and $In_{2\ KHz}$. The data processing unit 12 obtains a relative value between the direct current voltages $Vdc_{500\ Hz}$ and $Vdc_{2\ KHz}$ converted based on the measurement data $In_{500\ Hz}$ and $In_{2\ KHz}$ corresponding to the input signals for measurement $Pn_{500\ Hz}$ and $Pn_{2\ KHz}$. As this relative value, it is possible to employ the difference between the two measurement signals "$Vdc_{2\ KHz}-Vdc_{500\ Hz}$," the ratio between the two measurement signals "$Vdc_{2\ KHz}/Vdc_{500\ Hz}$," or the like. As a relative value, it is possible to employ any calculated value as long as the difference is clear when the measurement datasets $Vdc_{500\ Hz}$ and $Vdc_{2\ KHz}$ are compared.

The horizontal axis of FIG. 5 indicates the distance from the distal end of the measurement electrode 10 to the apex 23, and the vertical axis indicates the relative value of the "ratio" between $Vdc_{2\ KHz}$ and $Vdc_{500\ Hz}$. Similarly, FIG. 6 illustrates the "difference" between $Vdc_{2\ KHz}$ and $Vdc_{500\ Hz}$. These measurement datasets use, among the datasets illustrated in FIG. 2 to FIG. 4, the measurement datasets $In_{500\ Hz}$ and $In_{2\ KHz}$ corresponding to the input signals for measurement $Pn_{500\ Hz}$ and $Pn_{2\ KHz}$ of 500 Hz and 2 KHz, or $Vdc_{500\ Hz}$ and $Vdc_{2\ KHz}$ obtained by converting these datasets into direct current voltage values. The transition waveforms in FIG. 5 and FIG. 6 can be obtained by using the display unit 7 for displaying the relative value with a data trajectory as in an oscilloscope.

The ratio data of the inspection tooth 24 having a lateral branch e at the position 3 mm away from the apex 23 illustrated in FIG. 5 (••◇•• and ••Δ••) shows a convex shape at a position near 3 mm on the horizontal axis. However, the ratio data of the inspection tooth 24 having no lateral branch (••X••) shows a monotonically increasing curve. Therefore, the lateral branch e can be detected by observing the transition waveform in the ratio data of the inspection tooth 24 and detecting the convex transition waveform. This detection makes it possible to more clearly confirm the presence of the lateral branch e than the transition waveform of the measurement current In corresponding to the input signal for measurement Pn of any one of the frequencies illustrated in FIG. 2 to FIG. 4.

The difference data of the inspection tooth 24 having a lateral branch e at the position 3 mm away from the apex 23 illustrated in FIG. 6 (••◇•• and ••Δ••) shows a convex shape at a position near 3 mm on the horizontal axis. However, the difference data of the inspection tooth 24 having no lateral branch e (••X••) shows a monotonically increasing curve. Therefore, the lateral branch e can be detected by observing the transition waveform in the difference data of the inspection tooth 24 and detecting the convex transition waveform. This detection makes it possible to more clearly confirm the presence of the lateral branch e than the transition waveform of the measurement current In corresponding to the input signal for measurement Pn of any one of the frequencies illustrated in FIG. 2 to FIG. 4.

Hereinabove, it has been described that the "difference" or "ratio" can be employed as a relative value between the measurement currents $In_{500\ Hz}$ and $In_{2\ KHz}$ corresponding to the input signals for measurement Pn having different frequencies (for example, 500 Hz and 2 kHz). However, the relative value is not limited to these. In short, any value may be used as long as it is a relative value which makes it possible to more clearly detect the change in the measurement current In due to the presence of the lateral branch e.

First Embodiment

[Configuration of Lateral Branch Detection Probe]

The above-described lateral branch detection device 100 requires troublesome work due to the necessity to repeat the detection of the condition of the lateral branch e while inserting the measurement electrode 10 into the root canal 22. In view of the above, the lateral branch detection probe 200 according to the first embodiment of the present invention (FIG. 7) is allowed to detect the condition of the lateral branch e (presence or absence of the lateral branch e and its position in the root canal axis direction) after being inserted into the root canal 22.

Figure 7:
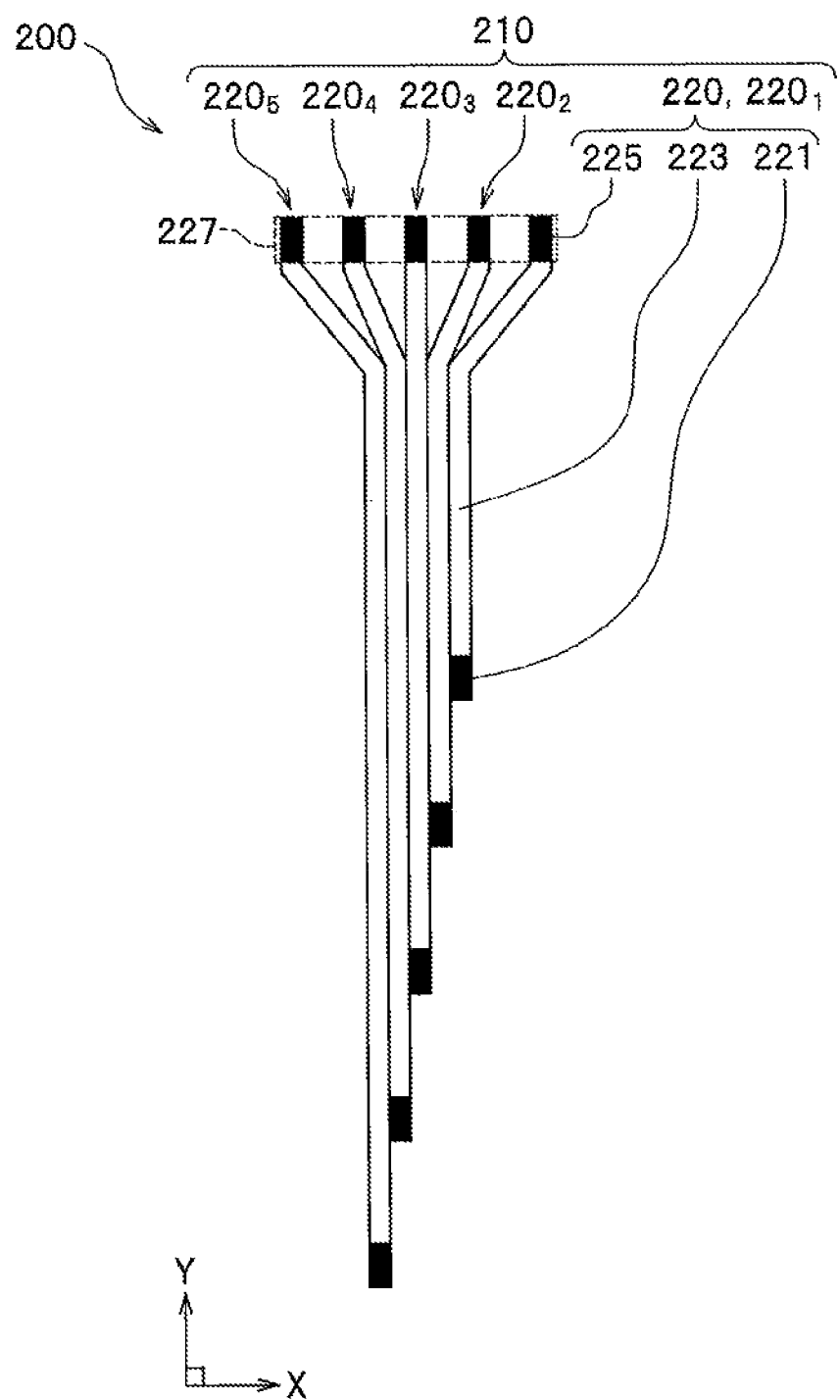
FIG. 7 is a schematic view of a lateral branch detection probe according to a first embodiment of the present invention.

As illustrated in FIG. 7, the lateral branch detection probe 200 includes a measurement electrode group 210 including a plurality of measurement electrodes 220 ($220_1$ to $220_5$) inserted into the root canal 22. That is, the lateral branch detection probe 200 includes a plurality of measurement electrodes 220 extended in the root canal axis direction Y to different positions at predetermined intervals. Although the lateral branch detection probe 200 includes five measurement electrodes $220_1$ to $220_5$ in the present embodiment, it suffices that the number of measurement electrodes 220 is two or more.

Note that the root canal axis direction Y is a direction along the root canal 22. In addition, the root canal axis radial direction X is a direction orthogonal to the root canal axis direction Y.

Each of the measurement electrodes 220 includes a conductor 221 which is an output electrode of the input signal for measurement Pn, an insulator 223, and a measurement terminal 225. For example, each measurement electrode 220 is obtained by covering a thin metal wire such as copper or aluminum with the insulator 223 such as vinyl, exposing one end portion to form the conductor 221, and forming the measurement terminal 225 at the other end portion. In addition, in the measurement electrodes 220, the conductors 221 are placed at substantially equal intervals in the root canal axis direction Y. In addition, in the measurement electrodes 220, the measurement terminals 225 are placed at substantially the same position in the root canal axis radial direction X, and these measurement terminals 225 constitute a measurement terminal group 227 which is connectable to the power supply 1. Specifically, the measurement electrodes 220 have the same structure except for the difference in length in the root canal axis direction Y. Moreover, in the measurement electrodes 220, the upper measurement terminals 225 are branched into five branches, and the conductors 221 are bundled together from the middle of the insulators 223.

Note that, in the lateral branch detection probe 200, the distance to the apex indicated by the horizontal axis in FIG. 2 to FIG. 6 is the distance from the distal end of each conductor 221 to the position of the apex 23 in the root canal axis direction Y.

[Configuration of Lateral Branch Detection Device]

Figure 8:
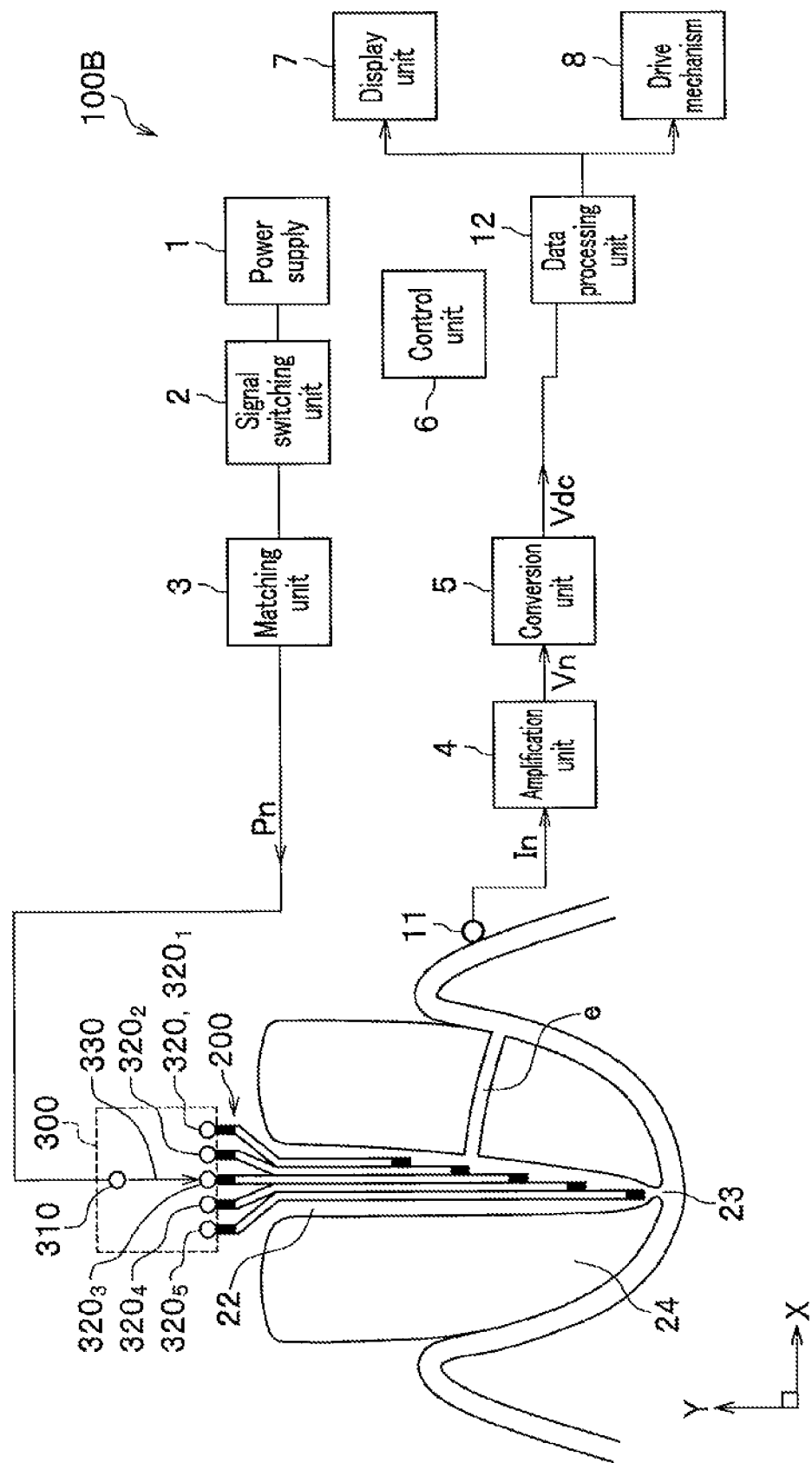
FIG. 8 is a block diagram illustrating a configuration of a lateral branch detection device using the lateral branch detection probe of FIG. 7.

FIG. 8 illustrates a lateral branch detection device 100B which uses the lateral branch detection probe 200. As the condition of the lateral branch e, the lateral branch detection device 100B detects the presence or absence of the lateral branch e and the position of the lateral branch e in the root canal axis direction Y for each measurement electrode 220. As illustrated in FIG. 8, the lateral branch detection device 100B includes a power supply (detection-purpose power supply) 1, a signal switching unit 2, a matching unit 3, an amplification unit 4, a conversion unit 5, a control unit 6, a display unit 7, a drive mechanism 8, an oral electrode (subject electrode) 11, a data processing unit 12, a lateral branch detection probe 200, and a measurement electrode switching unit 300.

Note that the configurations other than the measurement electrode switching unit 300 are the same as those in FIG. 1, and thus the description thereof is omitted.

The measurement electrode switching unit 300 is intended such that the power supply 1 sequentially switches and applies the input signal for measurement Pn to each of the measurement electrodes 220. Specifically, the measurement electrode switching unit 300 sequentially switches and outputs the input signal for measurement Pn to each measurement electrode 220. In addition, the measurement electrode switching unit 300 includes an input terminal 310, output terminals $320_1$ to $320_5$, and a switch unit 330. The input terminal 310 is connected to the matching unit 3. The output terminals $320_1$ to $320_5$ are connected to the measurement electrodes $220_1$ to $220_5$, respectively. The switch unit 330 electrically switches and connects the input terminal 310 and any one of the output terminals $320_1$ to $320_5$. For example, the measurement electrode switching unit 300 is a rotary switch that switches and outputs the input signal for measurement Pn to the measurement electrodes $220_1$ to $220_5$ at regular time intervals. In the example of FIG. 8, the measurement electrode switching unit 300 is ready to output the input signal for measurement Pn to the third measurement electrode $220_3$.

Note that the measurement electrode switching unit 300 is not limited to means for mechanically switching contacts, such as a rotary switch. For example, as the measurement electrode switching unit 300, it is possible to use means for electronic switching using an electronic component such as a demultiplexer.

Hereinafter, description is provided for two methods of inserting the lateral branch detection probe 200 into the apical position.

The first method is to expand the root canal 22 in advance by passing a reamer through the root canal 22, and then to insert the lateral branch detection probe 200. Specifically, in the treatment process, the root canal 22 is expanded with a reamer (file), and then the lateral branch detection probe 200 is inserted until the distal end of the lateral branch detection probe 200 hits the apex 23. Then, in the same manner as a conventional root canal length measuring apparatus, the apical position is detected with the measurement electrode $220_5$ located at the distal end in the root canal axis direction Y. Thereafter, the condition of the lateral branch e is detected using the detected apical position as a reference.

The second method is to form the peripheral edge of the distal end of the lateral branch detection probe 200 into a reamer structure. Specifically, the peripheral edge of the distal end of the lateral branch detection probe 200 is formed into a reamer structure, and the measurement electrode $220_5$ is provided at the distal end in the root canal axis direction Y. Then, the lateral branch detection probe 200 is inserted, and the apical position is detected with the measurement electrode $220_5$ while enlarging the root canal 22 as in the conventional root canal length measuring apparatus. Thereafter, the condition of the lateral branch e is detected using the detected apical position as a reference.

[Lateral Branch Detection Method by Lateral Branch Detection Device]

Hereinafter, the lateral branch detection method by the lateral branch detection device 100B is described.

First, in the lateral branch detection method, the oral electrode 11 is brought into contact with the intraoral surface of the inspection tooth 24, for example.

Next, in the lateral branch detection method, the lateral branch detection probe 200 is inserted to the apex 23 of the inspection tooth 24 (insertion step). In this insertion step, the drive mechanism 8 may automatically move the lateral branch detection probe 200 to the apex 23.

Next, in the lateral branch detection method, the condition of the lateral branch e is detected using the above-described lateral branch detection device 100B (detection step). This detection step includes the following procedures (1) to (7).

(1) The input signals for measurement $Pn_{500\,Hz}$ and $Pn_{2\,KHz}$ for two types of frequencies of 500 Hz and 2 KHz are sequentially supplied from the power supply 1 to the measurement electrode 220.

(2) The signal switching unit 2 adjusts the timing at which the input signals for measurement $Pn_{500\,Hz}$ and $Pn_{2\,KHz}$ are supplied so that two types of input signals for measurement $Pn_{500\,Hz}$ and $Pn_{2\,KHz}$ from the power supply 1 are alternately and sequentially supplied between the measurement electrode 220 and the oral electrode 11.

(3) Two types of measurement datasets (here, $In_{500\ Hz}$ and $In_{2\ KHz}$) between the measurement electrode 220 and the oral electrode 11, measured based on the two types of input signals for measurement $Pn_{500\ Hz}$ and $Pn_{2\ KHz}$ sequentially supplied between those two electrodes from the signal switching unit 2, are outputted from the oral electrode 11.

(4) Each of these two types of measurement datasets $In_{500\ Hz}$ and $In_{2\ KHz}$ is converted into a voltage value and amplified in the amplification unit 4 ($Vn_{500\ Hz}$ and $Vn_{2\ KHz}$).

(5) The two types of amplified voltage values $Vn_{500\ Hz}$ and $Vn_{2\ KHz}$ are converted into the direct current voltage values $Vdc_{500\ Hz}$ and $Vdc_{2\ KHz}$ in the conversion unit 5.

(6) The data processing unit 12 creates display data to be displayed on the display unit 7 based on the direct current voltage values $Vdc_{500\ Hz}$ and $Vdc_{2\ KHz}$. Here, the data processing unit 12 may obtain the difference or ratio between the direct current voltage values as a relative value between the direct current voltages $Vdc_{500\ Hz}$ and $Vdc_{2\ KHz}$.

(7) The measurement electrode switching unit 300 sequentially switches and outputs the input signal for measurement Pn to the measurement electrodes 220. Thereafter, the procedures (1) to (6) are repeated for each measurement electrode 220. Since the present embodiment includes the five measurement electrodes 220₁ to 220₅, the procedures (1) to (6) are repeated at least five times.

In the two types of measurement datasets (direct current voltages $Vn_{500\ Hz}$ and $Vn_{2\ KHz}$), each transition waveform and the change in the relative value (for example, difference or ratio) of the measurement datasets can be displayed on the display unit 7. Here, the data processing unit 12 may automatically monitor the change in measurement data and automatically detect the condition of the lateral branch e. In this way, the operator can confirm the condition of the lateral branch e.

[Operations and Effects]

As described above, since the lateral branch detection device 100B includes the conductors 221 located at different positions in the root canal axis direction Y, simply inserting the distal end of the lateral branch detection probe 200 to the apex 23 makes it possible to detect at once the condition of the plurality of lateral branches e corresponding to the positions of the conductors 221. Thereby, the lateral branch detection device 100B achieves reduction in the troublesome work without needing to repeat the condition detection for the lateral branch e while inserting the measurement electrode 10 into the root canal 22.

Second Embodiment

The second embodiment of the present invention is described while referring to the differences from the first embodiment.

The lateral branch detection probe 400 according to the second embodiment (FIG. 9) is different from the first embodiment in that it can also detect, as the condition of the lateral branch e, the position of the lateral branch e in the root canal axis surrounding direction in addition to the position of the lateral branch e in the root canal axis direction.

[Configuration of Lateral Branch Detection Probe]

Figure 9:
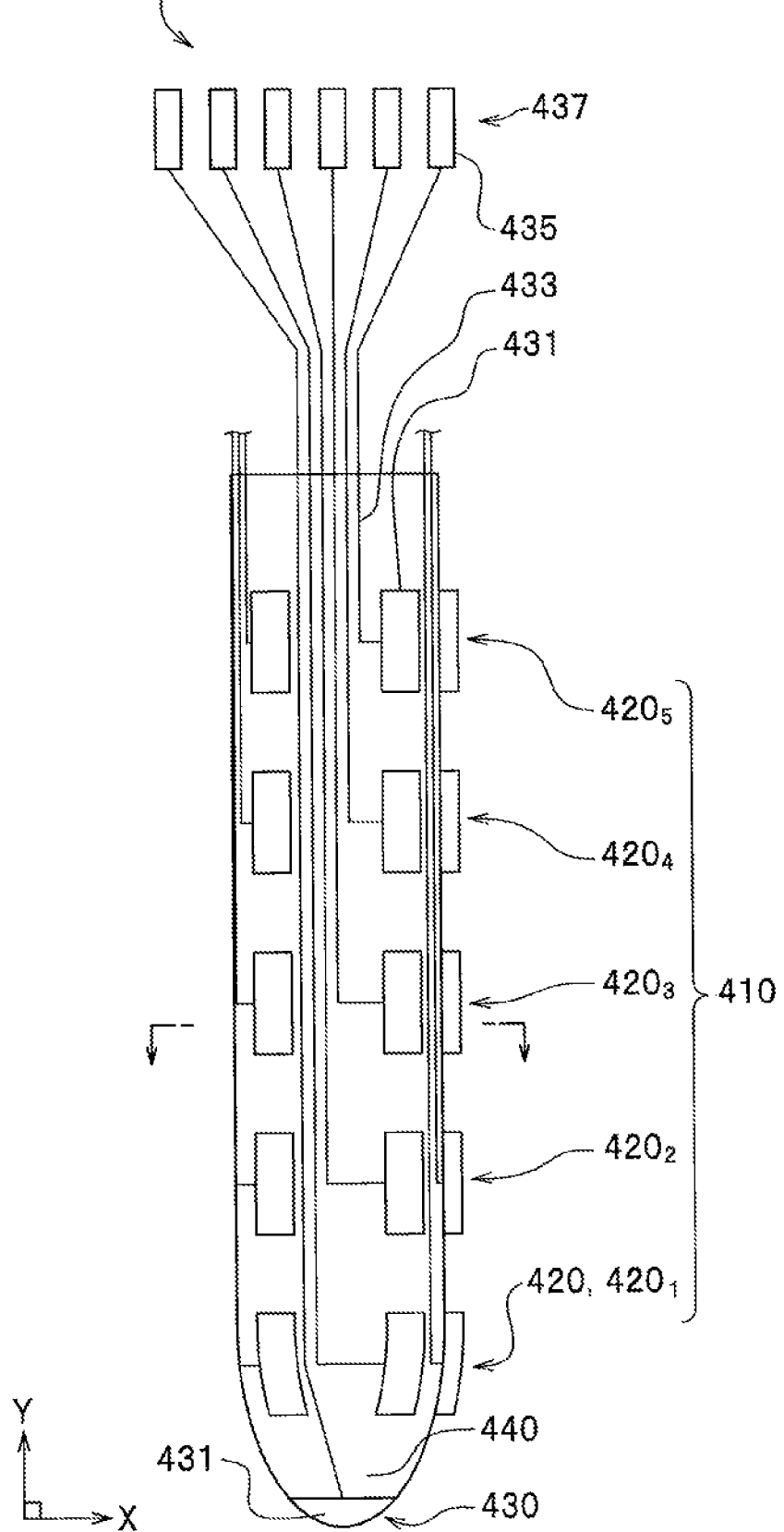
FIG. 9 is a schematic view of a lateral branch detection probe according to a second embodiment of the present invention.
Figure 10:
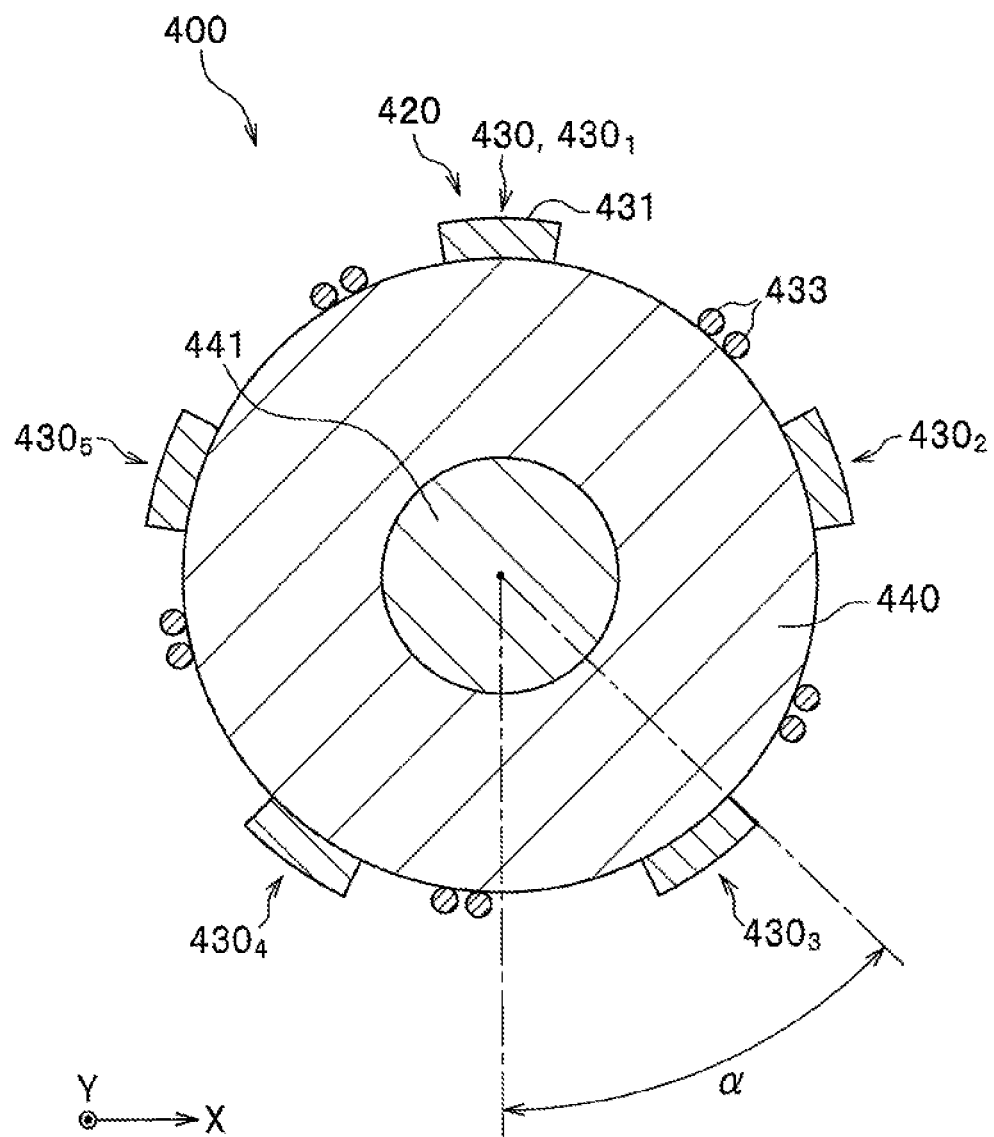
FIG. 10 is a cross-sectional view of the lateral branch detection probe of FIG. 9.

As illustrated in FIG. 9, the lateral branch detection probe 400 includes a multi-tier measurement electrode group 410 including conductors 431 provided the surface of a hollow-cylindrical flexible material 440 and divided in the root canal axis direction Y and the root canal axis surrounding direction α (FIG. 10). Here, the multi-tier measurement electrode group 410 includes a circumferential direction measurement electrode group 420 placed at regular intervals in the root canal axis direction Y. In the present embodiment, the multi-tier measurement electrode group 410 is composed of circumferential measurement electrode groups 420₁ to 420₅ disposed in five steps at substantially equal intervals in the root canal axis direction Y. Moreover, the lateral branch detection probe 400 includes measurement electrodes 430 at the distal end in the root canal axis direction Y.

As illustrated in FIG. 10, the circumferential measurement electrode group 420 includes measurement electrodes 430 placed at regular intervals in the root canal axis surrounding direction α. That is, the circumferential measurement electrode group 420 includes the measurement electrodes 430 disposed on a plane substantially perpendicular to the root canal axis direction Y. Specifically, in the circumferential measurement electrode group 420, the conductors 431 to be described later are circumferentially disposed on the surface of the lateral branch detection probe 400. Moreover, in the circumferential measurement electrode group 420, lead-out lines 433 are disposed in parallel along the root canal axis direction Y between the conductors 431. In the present embodiment, the circumferential measurement electrode group 420 is composed of five measurement electrodes 430₁ to 430₅ disposed at intervals of approximately 72 degrees in the root canal axis surrounding direction α.

Note that the root canal axis surrounding direction α is a rotational direction with the root canal 22 as a rotational axis.

As illustrated in FIG. 9, the measurement electrodes 430 include conductors 431 which are output electrodes of the input signal for measurement Pn, lead-out lines 433 which supply the input signal for measurement Pn to the conductors 431, and measurement terminals 435. The conductor 431 is made of copper foil or the like formed into a rectangular shape. The lead-out line 433 is formed by covering the surface of a conductive wire such as copper or aluminum with an insulator such as vinyl. In addition, both ends of the conductive wire of the lead-out line 433 are electrically connected to the conductor 431 and the measurement terminal 435. Here, in order to make the drawing easy to see, the measurement terminal 435 is illustrated above the flexible material 440, but the measurement terminal 435 may be placed on the upper portion of the flexible material 440. In addition, the measurement terminals 435 arranged in the vicinity of the measurement electrodes 430 constitute a measurement terminal group 437 which is connectable to the power supply 1. As described above, in the lateral branch detection probe 400, the measurement terminals 435 are disposed at equal intervals in the root canal axis direction Y and the root canal axis surrounding direction α on the surface of the flexible material 440.

Moreover, the lateral branch detection probe 400 includes a measurement electrode 430 so that the conductor 431 is located at the distal end in the root canal axis direction Y. The measurement electrode 430 includes a parabolic conductor 431, and the conductor 431 is placed at the distal end of the flexible material 440. Thereby, it can be detected that the distal end of the lateral branch detection probe 400 has been inserted to the apical position.

Note that, in the lateral branch detection probe 400, the distance to the apex indicated by the horizontal axis in FIG. 2 to FIG. 6 is the distance in the root canal axis direction Y from the distal end of each conductor 431 to the position of the apex 23.

The flexible material 440 is made of a flexible material such as polyimide formed into a hollow-cylindrical shape so that the distal end side is thin. In addition, the flexible material 440 includes a core material 441 such as stainless steel inside the hollow-cylinder so as to reduce the risk of bending when the lateral branch detection probe 400 is inserted. That is, the flexible material 440 can be formed by winding a flexible material such as polyimide around the core material 441. With such a structure, the lateral branch detection probe 400 has both flexibility and strength, and can be easily inserted to the apex 23.

In addition, the flexible material 440 has a conductor 431 placed at the distal end thereof.

[Configuration of Lateral Branch Detection Device]

Figure 11:
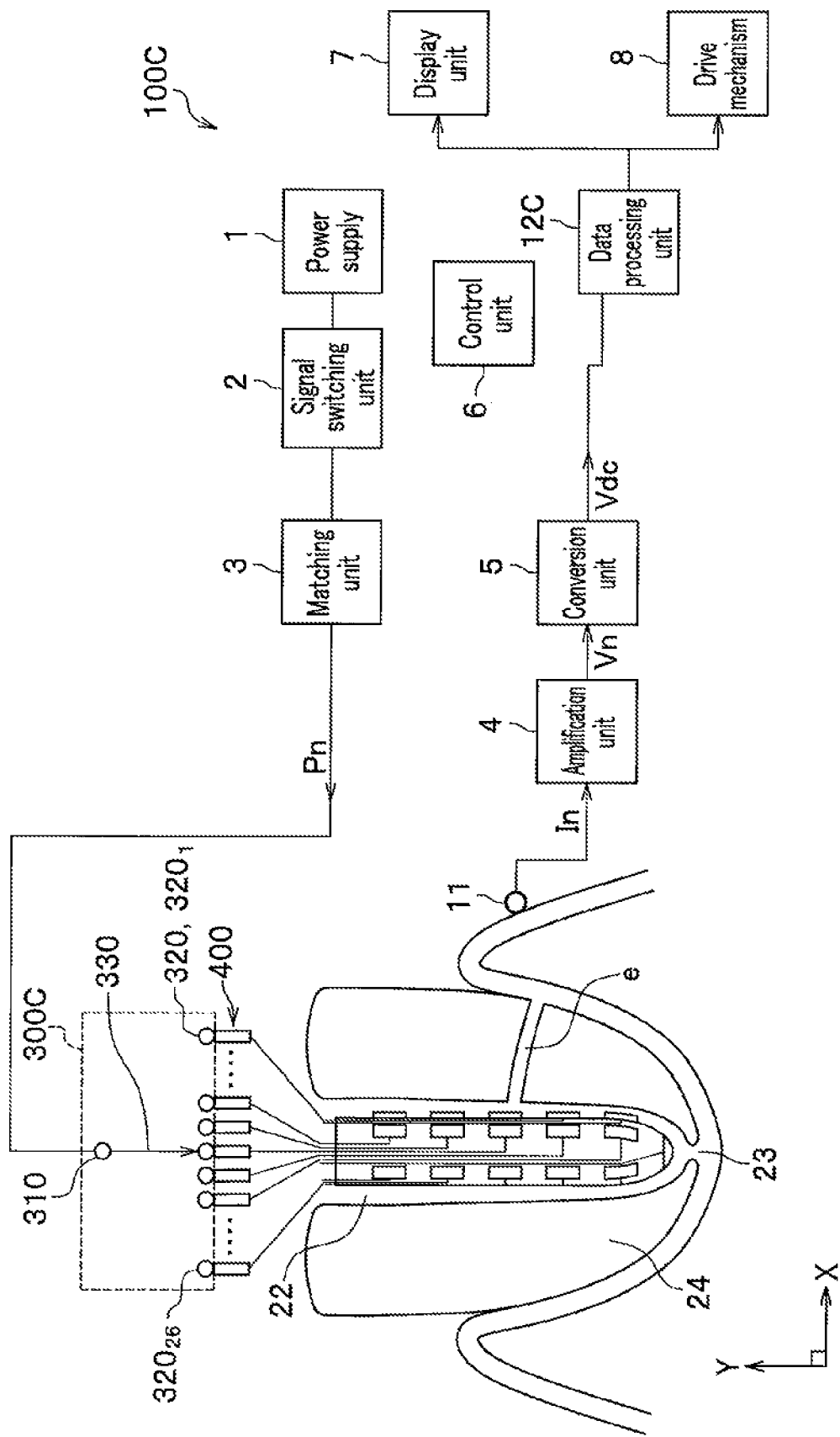
FIG. 11 is a block diagram illustrating a configuration of a lateral branch detection device using the lateral branch detection probe of FIG. 9.

FIG. 11 illustrates a lateral branch detection device 100C which uses the lateral branch detection probe 400. As the condition of the lateral branch e, the lateral branch detection device 100C detects the presence or absence of the lateral branch e and the position of the lateral branch e in the root canal axis direction Y and the root canal axis surrounding direction α for each measurement electrode 430. As illustrated in FIG. 11, the lateral branch detection device 100C includes a power supply 1, a signal switching unit 2, a matching unit 3, an amplification unit 4, a conversion unit 5, a control unit 6, a display unit 7, a drive mechanism 8, an oral electrode 11, a data processing unit 12C, a measurement electrode switching unit 300C, and a lateral branch detection probe 400.

Note that the configurations other than the data processing unit 12C and the measurement electrode switching unit 300C are the same as those in the first embodiment, and thus the description thereof is omitted. In addition, in order to make the drawings easy to see, some configurations and reference numerals are omitted.

The data processing unit 12C can also automatically detect the position of the lateral branch e in the root canal axis surrounding direction α in addition to the position of the lateral branch e in the root canal axis direction Y. For example, the data processing unit 12C detects, as the position of the lateral branch e, the position of the measurement electrode 430 for which the measurement current In is maximum among the plurality of measurement electrodes 430 placed in the root canal axis direction Y and the root canal axis surrounding direction α.

Here, description is provided for the reason why the position in the root canal axis surrounding direction α can be detected. The measurement current In flows through the apical foramen and the lateral branch e. For this reason, the distance between the conductor 431 and the opening of the lateral branch e becomes longer as the conductor 431 of the measurement electrode 430 is farther from the opening of the lateral branch e. As a result, the current flowing through the lateral branch e is reduced. Therefore, the measurement current In flowing between the measurement electrode 430 and the oral electrode 11 increases as the conductor 431 of the measurement electrode 430 approaches the opening of the lateral branch e.

The position of the lateral branch e in the root canal axis surrounding direction α can be calculated from the ratio of the measurement currents In between adjacent measurement electrodes 430. For example, when the measurement currents In of adjacent measurement electrodes 430 are equal, the opening of the lateral branch e is located in the middle of these two measurement electrodes 430. In addition, when the ratio of the measurement currents In between adjacent measurement electrodes 430 is 3:1, the position of the lateral branch e is closer to the measurement electrode 430 with the larger measurement current In at a distance ratio of 1:3. Therefore, the position of the lateral branch e in the root canal axis surrounding direction α does not have to be on the measurement electrode 430 (conductor 431) placed on a plane substantially perpendicular to the root canal axis direction Y.

Note that the position of the lateral branch e in the root canal axis direction Y can also be calculated from the ratio of the measurement currents In of adjacent measurement electrodes 430 as in the root canal axis surrounding direction α.

Figure 12:
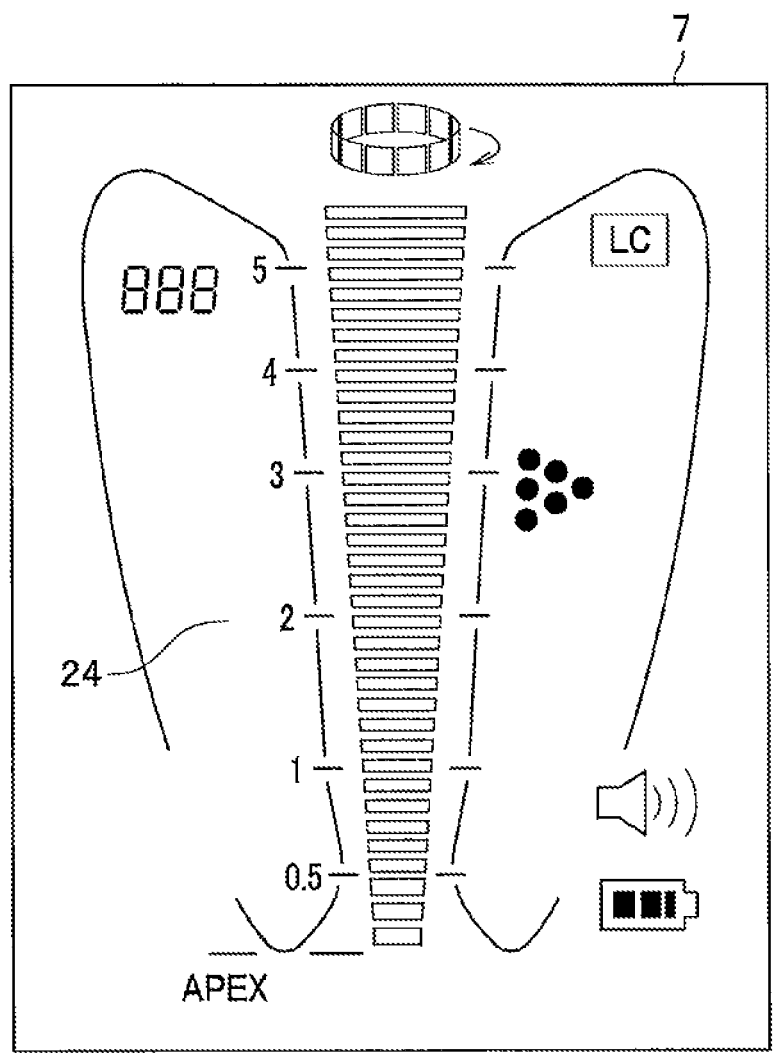
FIG. 12 is a diagram illustrating an example of a display unit in the second embodiment of the present invention.
Figure 13:
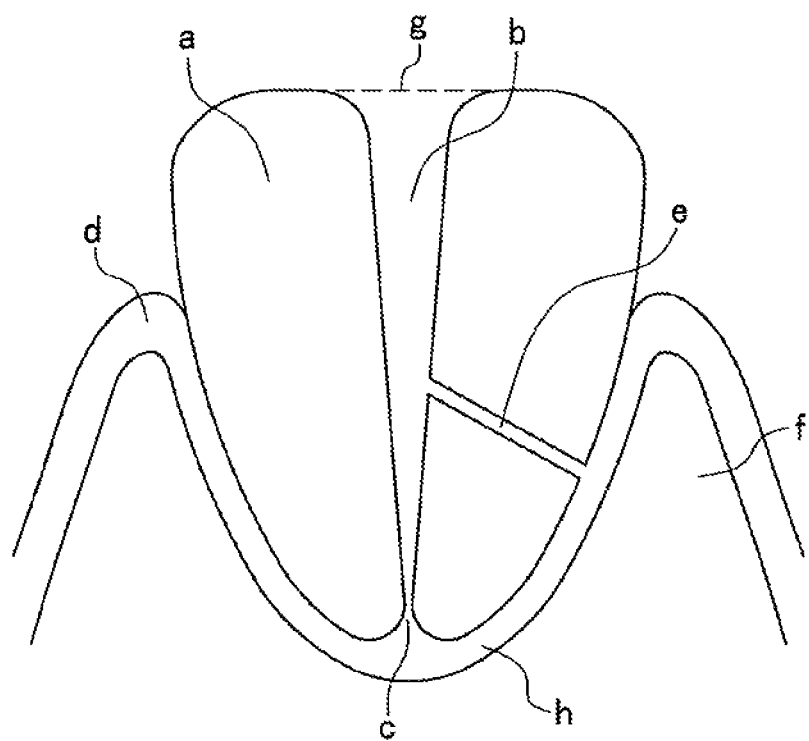
FIG. 13 is a cross-sectional view of a tooth having a lateral branch and an apical foramen.

For example, the display unit 7 displays the position of the lateral branch e as illustrated in FIG. 12. The position of the lateral branch e in the root canal axis direction Y is displayed with circles (six circles in FIG. 12) on the right side of the display unit 7. In addition, the display unit 7 can display the height of the lateral branch e even when the measurement electrode 430 is at a position deviated from any of the marks "0.5, 1, 2, 3, 4" in the middle. In addition, the position of the lateral branch e in the root canal axis surrounding direction α may be displayed with an arrow on the display unit 7 so that the direction can be seen in a clock-like manner, or may be displayed in terms of angle using a plurality of bars forming a circle at the upper portion of the display unit 7. In addition, a lateral branch reference position may be provided to numerically display the angle (direction of the opening of the detected lateral branch e) with a numerical value at the upper left of the display unit 7.

Note that, since the level meter portion in FIG. 12 indicates the position of the measurement electrode 430 at the distal end, it can be confirmed whether or not the lateral branch detection probe 400 is at the apical position.

The measurement electrode switching unit 300C sequentially switches and outputs the input signal for measurement Pn to the measurement electrode 430. In addition, the measurement electrode switching unit 300C includes an input terminal 310, output terminals $320_1$ to $320_{26}$, and a switch unit 330. The output terminals $320_1$ to $320_{26}$ are connected to the respective measurement electrodes 430. The switch unit 330 electrically switches and connects the input terminal 310 and any one of the output terminals $320_1$ to $320_{26}$. For example, the measurement electrode switching unit 300C is a rotary switch that switches and outputs the input signal for measurement Pn to 26 measurement electrodes 430 at regular time intervals.

Note that the method of inserting the lateral branch detection probe 400 into the apical position is the same as in the first embodiment, and thus the description thereof is omitted.

[Lateral Branch Detection Method by Lateral Branch Detection Device]

Hereinafter, the lateral branch detection method by the lateral branch detection device 100C is described.

First, in the lateral branch detection method, the oral electrode 11 is brought into contact with the intraoral surface of the inspection tooth 24, for example.

Next, in the lateral branch detection method, the lateral branch detection probe 400 is inserted to the apex 23 of the inspection tooth 24 (insertion step). In this insertion step, the drive mechanism 8 may automatically move the lateral branch detection probe 400 to the apex 23.

Next, in the lateral branch detection method, the condition of the lateral branch e is detected using the above-described lateral branch detection device 100C (detection step). This detection step includes the following procedures (10) to (16).

(10) The input signals for measurement $Pn_{500\ Hz}$ and $Pn_{2\ KHz}$ for two types of frequencies of 500 Hz and 2 KHz are sequentially supplied from the power supply 1 to the measurement electrode 430.

(11) The signal switching unit 2 adjusts the timing at which the input signals for measurement $Pn_{500\ Hz}$ and $Pn_{2\ KHz}$ are supplied so that two types of input signals for measurement $Pn_{500\ Hz}$ and $Pn_{2\ KHz}$ from the power supply 1 are alternately and sequentially supplied between the measurement electrode 430 and the oral electrode 11.

(12) Two types of measurement datasets (here, $In_{500\ Hz}$ and $In_{2\ KHz}$) between the measurement electrode 430 and the oral electrode 11, measured based on the two types of input signals for measurement $Pn_{500\ Hz}$ and $Pn_{2\ KHz}$ sequentially supplied between those two electrodes from the signal switching unit 2, are outputted from the oral electrode 11.

(13) Each of these two types of measurement datasets $In_{500\ Hz}$ and $In_{2\ KHz}$ is converted into a voltage value and amplified in the amplification unit 4 ($Vn_{500}$ Hz and $Vn_{2\ KHz}$).

(14) The two types of amplified voltage values $Vn_{500}$ Hz and $Vn_{2\ KHz}$ are converted into the direct current voltage values $Vdc_{500\ Hz}$ and $Vdc_{2\ KHz}$ in the conversion unit 5.

(15) The data processing unit 12C creates display data to be displayed on the display unit 7 based on the direct current voltage values $Vdc_{500\ Hz}$ and $Vdc_{2\ KHz}$. Here, the data processing unit 12C may obtain the difference or ratio between the direct current voltage values as a relative value between the direct current voltages $Vdc_{500\ Hz}$ and $Vdc_{2\ KHz}$.

(16) The measurement electrode switching unit 300C sequentially switches and outputs the input signal for measurement Pn to the measurement electrodes 430, and the procedures (10) to (15) are repeated for each measurement electrode 430. Since the present embodiment includes the 26 measurement electrodes 430, the procedures (10) to (15) are repeated at least 26 times.

In the two types of measurement datasets (direct current voltages $Vn_{500\ Hz}$ and $Vn_{2\ KHz}$), each transition waveform and the change in the relative value (for example, difference or ratio) of the measurement datasets can be displayed on the display unit 7. Here, the data processing unit 12C may automatically monitor the change in measurement data and automatically detect the condition of the lateral branch e. In this way, the operator can confirm the condition of the lateral branch e.

[Operations and Effects]

As described above, since the lateral branch detection device 100C includes the conductors 431 located at different positions in the root canal axis direction Y and the root canal axis surrounding direction α, simply inserting the distal end of the lateral branch detection probe 400 to the apex 23 makes it possible to detect at once the condition of the plurality of lateral branches e corresponding to the positions of the conductors 431. Thereby, the lateral branch detection device 100C achieves reduction in the troublesome work without needing to repeat the condition detection for the lateral branch e while inserting the measurement electrode 10 into the root canal 22.

Embodiments of the present invention have been described in detail, but the present invention is not limited to the above-described embodiments, and includes design changes and the like within a scope not departing from the gist of the present invention.

In each of the above-described embodiments, the oral electrode is described as being brought into contact with the intraoral surface of the subject, but the present invention is not limited to this. For example, the subject electrode may be an electrode of a type that the subject grips with a hand. Therefore, the contact position of the subject electrode is not limited to the intraoral surface, and may be a part of the body of the subject.

In each of the embodiments described above, only one lateral branch is illustrated. However, even when there are a plurality of lateral branches, the lateral branch detection device can detect the condition of these lateral branches.

In each of the above-described embodiments, the measurement electrodes are described as being placed at equal intervals. However, the measurement electrodes may be placed at different intervals. Moreover, the number of measurement electrodes only needs to be more than one, and the number thereof is not limited to those of the above-described embodiments.

In the second embodiment described above, the flexible material is described as including a core material. However, the flexible material may be formed in a solid-cylindrical shape, and the flexible material does not have to include a core material.

The lateral branch detection probe may include a stopper for fixture to the inspection tooth. This stopper may be of a size that allows fixture of the lateral branch detection probe to the inspection tooth, and may be smaller than the inspection tooth. In order to measure the distance from the position of the measurement electrode for lateral branch detection to the stopper, the lateral branch detection probe may be provided with graduation marks, or the lateral branch detection probe may be color-coded instead of graduation marks.

Here, after the detection of the lateral branch e is completed, the stopper is lowered to the upper portion of the inspection tooth, and the lateral branch detection probe is fixed. After the fixture, the distance from the position of the measurement electrode for lateral branch detection to the stopper is measured. Thereby, the lateral branch detection probe can detect the lateral branch position with higher accuracy.

In the above-described embodiments, the lateral branch detection device is described as independent hardware, but the present invention is not limited to this. For example, the present invention can be achieved with a program that causes hardware resources such as a CPU, a memory, and a hard disk included in a computer to operate in cooperation as the above-described lateral branch detection device. This program may be distributed via a communication line, or may be distributed after being written on a recording medium such as a CD-ROM or a flash memory.

REFERENCE SIGNS LIST 1 power supply (detection-purpose power supply)
2 signal switching unit
3 matching unit
4 amplification unit
5 conversion unit
6 control unit
7 display unit
8 drive mechanism
11 oral electrode (subject electrode)
12, 12C data processing unit
100B, 100C lateral branch detection device
200 lateral branch detection probe
210 measurement electrode group
220, $220_1$ to $220_5$ measurement electrode
221 conductor
223 insulator
225 measurement terminal
227 measurement terminal group 300, 300C measurement electrode switching unit
400 lateral branch detection probe
410 multi-tier measurement electrode group
420 circumferential measurement electrode group
430 measurement electrode
431 conductor
433 lead-out line
435 measurement terminal
437 measurement terminal group

The invention claimed is:

1. A lateral branch detection device which detects a condition of a lateral branch after being inserted into a root canal of a tooth of a subject, the lateral branch detection device comprising:
 a measurement electrode group including a plurality of measurement electrodes which are inserted into the root canal;
 a subject electrode which is configured to be disposed on a part of a body of the subject;
 a power supply which outputs input signals for measurement having one or more different frequencies;
 a signal switching unit which selects or switches one or more different frequencies of the input signals for measurement;
 a matching unit which converts the input signals for measurement supplied to the measurement electrode into a predetermined voltage;
 a measurement electrode switching unit which sequentially switches the measurement electrodes of the measurement electrode group and outputs the input signal for measurement to each measurement electrode individually with the measurement electrodes remaining inserted in the root canal, the measurement electrode switching unit comprising:
  an input terminal connected to the matching unit,
  output terminals connected to the measurement electrodes respectively, and
  a switch unit that electrically switches and connects the input terminal and any one of the output terminals; and
 a data processing unit configured to operate the signal switching unit and the measurement electrode switching unit to automatically detect and monitor a maximum current among the plurality of measurement electrodes as a position of the lateral branch, wherein
 the subject electrode outputs a measurement current between the measurement electrode and the subject electrode when an input signal for measurement is applied to each of the plurality of measurement electrodes,
 the measurement electrode group has a plurality of electrodes with different positions in a root canal axis direction,
 the data processing unit detects, as the position of the lateral branch, a position of a measurement electrode for which the measurement current is maximum among the plurality of measurement electrodes placed in the root canal axis direction by the measurement data based on each current output from the subject electrode with the measurement electrodes remaining inserted in the root canal, and
 the lateral branch detection device detects the condition of the lateral branch extending from the root canal to a periodontal ligament space based on a plurality of measurement datasets sequentially detected between the measurement electrodes and the subject electrode based on the input signals for measurement from the power supply.

2. The lateral branch detection device according to claim 1, further comprising a notification unit which provides a notification of the measurement datasets.

3. The lateral branch detection device according to claim 1, wherein
 the input signals for measurement are input signals for measurement having two frequencies, and
 the measurement datasets include a relative value between two measurement datasets sequentially detected based on the input signals for measurement having two frequencies.

4. The lateral branch detection device according to claim 3, wherein the relative value is one of a difference and a ratio between the two measurement datasets.

5. The lateral branch detection device according to claim 1, wherein the lateral branch detection device detects that conditions of a plurality of the lateral branches at once with a distal end of the measurement electrode group inserted to an apex of the tooth.

6. A lateral branch detection device which detects a condition of a lateral branch after being inserted into a root canal of a tooth of a subject, the lateral branch detection device comprising:
 a measurement electrode group including a plurality of measurement electrodes which are inserted into the root canal;
 a subject electrode which is configured to be disposed on a part of a body of the subject;
 a power supply which outputs input signals for measurement having one or more different frequencies;
 a signal switching unit which selects or switches one or more different frequencies of the input signals for measurement;
 a matching unit which converts the input signals for measurement supplied to the measurement electrode into a predetermined voltage;
 a measurement electrode switching unit which sequentially switches the measurement electrodes of the measurement electrode group and outputs the input signal for measurement to each measurement electrode individually with the measurement electrodes remaining inserted in the root canal, the measurement electrode switching unit comprising:
  an input terminal connected to the matching unit,
  output terminals connected to the measurement electrodes respectively, and
  a switch unit that electrically switches and connects the input terminal and any one of the output terminals; and
 a data processing unit configured to operate the signal switching unit and the measurement electrode switching unit to automatically detect and monitor a maximum current among the plurality of measurement electrodes as a position of the lateral branch, wherein
 the subject electrode outputs a measurement current between the measurement electrode and the subject electrode when an input signal for measurement is applied to each of the plurality of measurement electrodes-,
 the measurement electrode group has a plurality of electrodes with different positions in a root canal axis direction and a plurality of electrodes with different positions in a root canal axis surrounding direction which is different from the root canal axis direction, the data processing unit detects, as the position of the lateral branch, a position of a measurement electrode for which the measurement current is maximum among the plurality of measurement electrodes placed in the root canal axis direction and the root canal axis surrounding direction by the measurement data based on each current output from the subject electrode with the measurement electrodes remaining inserted in the root canal, and
the lateral branch detection device detects the condition of the lateral branch extending from the root canal to a periodontal ligament space based on a plurality of measurement datasets sequentially detected between the measurement electrodes and the subject electrode based on the input signals for measurement from the power supply.

\* \* \* \* \*